Sept. 9, 1947.   A. CATELLIER   2,427,123
FRUIT UTENSIL
Filed June 14, 1944
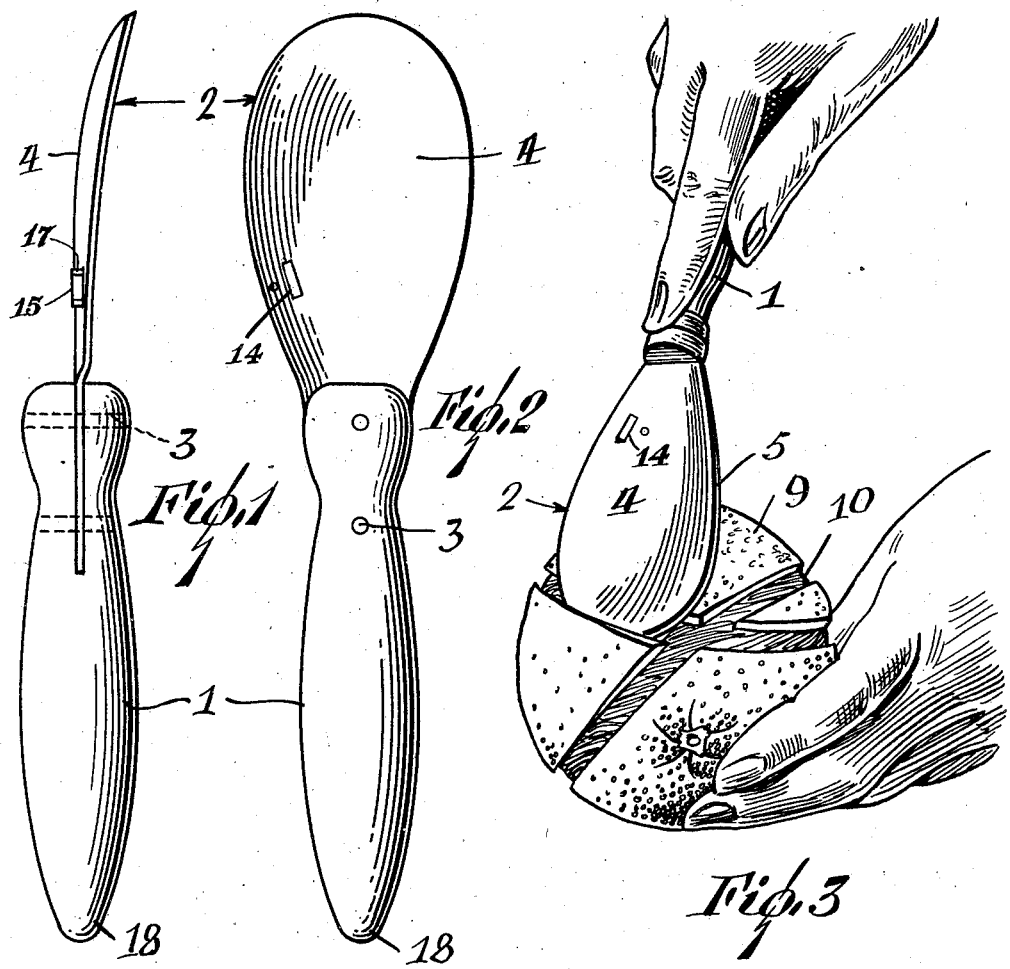
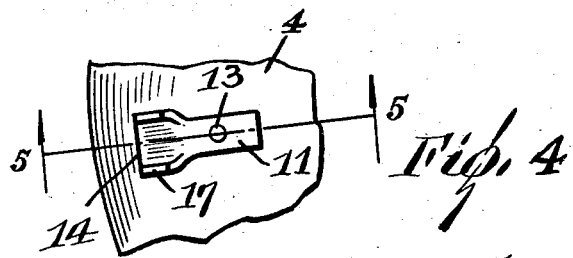
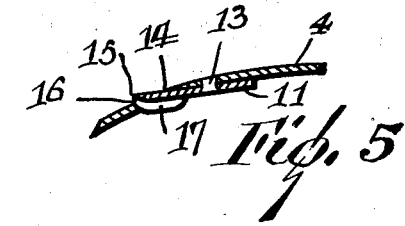
Inventor:
Armand Catellier Patented Sept. 9, 1947

2,427,123

UNITED STATES PATENT OFFICE 2,427,123

FRUIT UTENSIL

Armand Catellier, Montreal, Quebec, Canada

Application June 14, 1944, Serial No. 540,221

1 Claim. (Cl. 30—24)

The present invention pertains to a novel utensil for removing the peel from fruit, particularly oranges. The principal object of the invention is to provide a device of this character capable of severing and removing the peel without rupturing the body of the fruit.

In the accomplishment of this object, the device comprises a handle carrying a scoop-like blade. Near an edge of the blade is provided a grooving tool formed either as a separate part of the blade and conveniently positioned for cutting grooves in the ring. The blade, which is preferably sharpened at the edges, is then inserted beneath the skin at the grooves. Because of its scoop-like form, the blade can easily be manipulated to separate the rind without rupturing the fruit.

The invention is fully disclosed by way of example in the following description and in the accompanying drawing in which:

Figure 1 is an edge view of the device;

Figure 2 is an elevation;

Figure 3 is a perspective view of the device in use;

Figure 4 is a detail elevation, and

Figure 5 is a section on the line 5—5 of Figure 4.

Reference to these views will now be made by use of like characters which are employed to designate corresponding parts throughout.

In Figures 1 and 2 the device is shown as comprising a handle 1 having a blade 2 inserted in one end thereof. The blade is secured in the handle by suitable means such as pins 3. The exposed portion of the blade is approximately ovoid in elevation and is dished in the form of a scoop, as indicated by the numeral 4 in Figures 1 and 5. The edges are sharpened at 5, as also shown in Figure 4.

A slot 6 is cut out of the blade near one edge 5 and receives a grooving member composed of a strip 11 fastened to the concave side of the blade 12 by a rivet 13 and passes through a slot 14 to the convex side of the blade. The free edge of the strip on the convex side of the blade is sharpened at 15 and spaced at 16 from said side. The longitudinal edges of the strip are formed with guide flange 17, so that the strip of peel removed is fed through the space 16.

In the use of the device, the convex side of the blade 2 is first laid against the orange 9 in Figure 3. By means of the sharp edge 15, one or more grooves 10 are cut through the peel, preferably along circles spaced 90° apart. In this operation, the blade is conveniently balanced by the nearer edge 5 resting on the orange, while the pressure is applied so that the edge 15 cuts into the peel. The strip thus removed, on advancing the blade 2, passes through the slot 14.

The upper edge of the blade is next inserted beneath the skin at any of the grooves 10. By proper manipulation the blade severs the skin without rupturing the body of the fruit.

The free end of the handle is pointed as at 18. After the peel has been removed entirely as previously described, the pointed end 18 may be pressed into the orange at the juncture of the segments and thus employed to divide the orange without rupturing the segments.

Although specific embodiments of the invention have been illustrated and described, it will be understood that various alterations in the details of construction may be made without departing from the scope of the invention as indicated by the appended claim.

What I claim as my invention is:

A fruit utensil comprising a handle, a concave-convex blade fastened to one end thereof and having an opening therethrough, a flat blade secured to the concave side of said first blade and extending through said opening, said flat blade being sharpened on the end exposed at the convex side of the first blade, and a pair of spaced parallel flanges on said flat blade, extending transversely of its sharpened end and into the concavity of the first blade.

ARMAND CATELLIER.

REFERENCES CITED

The following references are of record in the file of this patent:

UNITED STATES PATENTS

| Number | Name | Date |
|---|---|---|
| 206,707 | Doane | Aug. 6, 1878 |
| 379,328 | Porter | Mar. 13, 1888 |
| 561,842 | Wilks | June 9, 1896 |
| 719,606 | Nelson et al. | Feb. 3, 1903 |
| 1,771,296 | Harley et al. | July 22, 1930 |
| 1,982,193 | Darr | Nov. 27, 1934 |